United States Patent [19]

Brugger et al.

[11] Patent Number: 4,745,999

[45] Date of Patent: May 24, 1988

[54] CLUTCH OPERATING CYLINDER FOR A PRESSURE-MEDIUM OPERATED CLUTCH

[75] Inventors: Franz Brugger, Winnenden; Franz Moser, Wendlingen; Thomas Ruhl, Ostfildern, all of Fed. Rep. of Germany

[73] Assignee: Daimler-Benz Aktiengesellschaft, Stuttgart, Fed. Rep. of Germany

[21] Appl. No.: 56,708

[22] Filed: Jun. 2, 1987

[30] Foreign Application Priority Data

Jun. 2, 1986 [DE] Fed. Rep. of Germany ....... 3618525

[51] Int. Cl.⁴ ............................................. F16D 25/08
[52] U.S. Cl. ................... 192/83; 192/85 C; 192/91 R
[58] Field of Search .................... 192/83, 85 C, 91 R; 91/509, 510; 60/567; 92/62

[56] References Cited

U.S. PATENT DOCUMENTS 3,171,526 3/1965 Waclawek .................... 192/85 C X

FOREIGN PATENT DOCUMENTS 0090945 2/1983 European Pat. Off. .
3213012 7/1985 Fed. Rep. of Germany .
1155231 4/1958 France ..................... 92/62
529956 11/1976 U.S.S.R. ..................... 192/83

Primary Examiner—Rodney H. Bonck
Attorney, Agent, or Firm—Barnes & Thornburg

[57] ABSTRACT

A clutch operating cylinder for a pressure-medium operated clutch which is arranged in the power train of a vehicle, is operable either by the clutch pedal or via a electronically controlled system, for example an anti-slip regulating system, has a housing divided into two chambers. In these chambers there are, apart from the release piston, two further pistons and a spring having a clutch characteristic, such that the electronic control is never able to clutch further than is specified by the clutch pedal, the clutch pedal bites when it is operated subsequent to electronically controlled engagement, and it is possible to use both the clutch pedal and the electronic control to declutch further when the clutch has only been partially declutched.

7 Claims, 1 Drawing Sheet

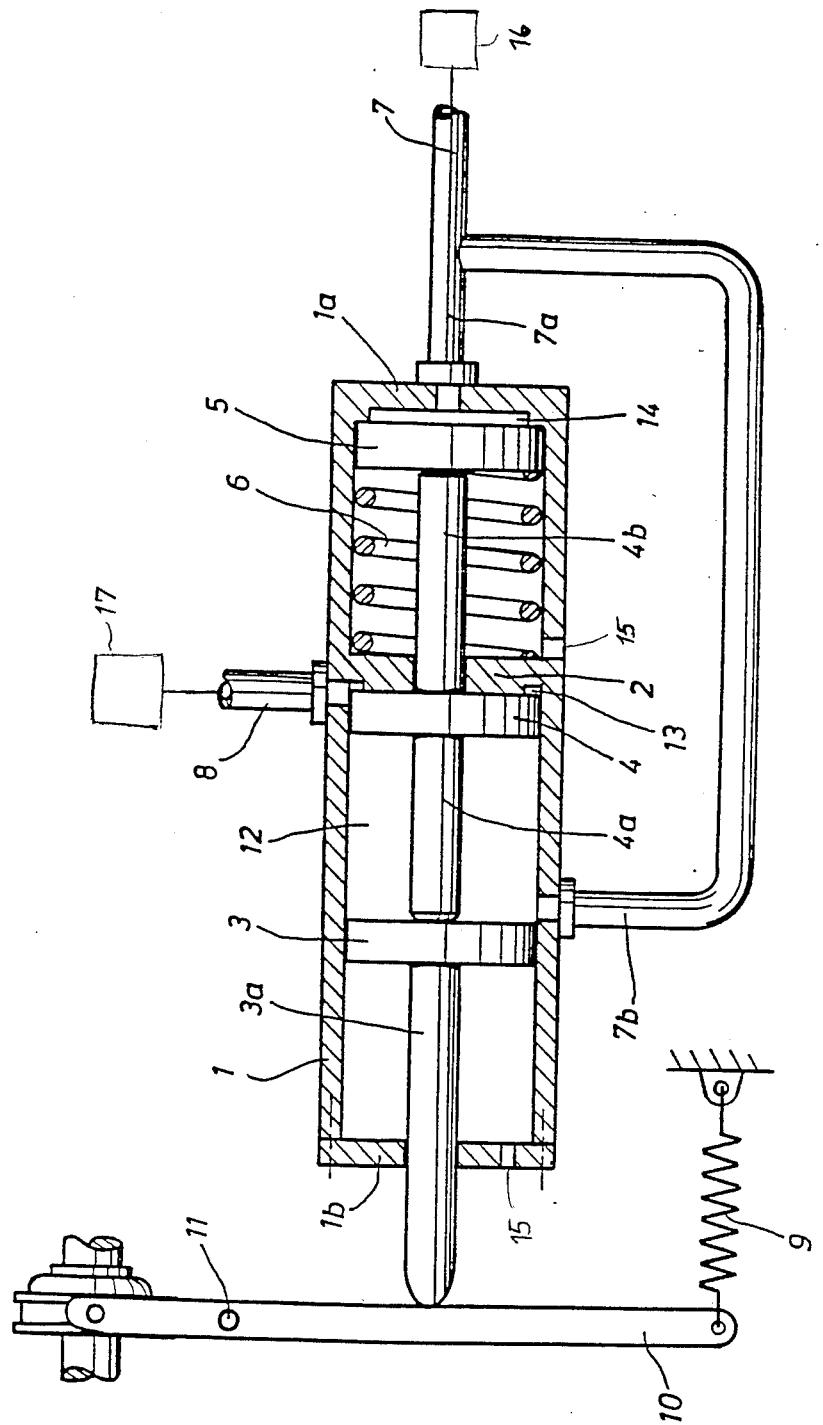

CLUTCH OPERATING CYLINDER FOR A PRESSURE-MEDIUM OPERATED CLUTCH

BACKGROUND AND SUMMARY OF THE INVENTION

The invention relates to a clutch operating cylinder for a pressure-medium operated clutch, with a release piston which is axially displaceable in a cylindrical housing and acts via a push rod on a clutch release fork imposed by a restoring spring. Such an arrangement is generally known in hydraulic clutch operation.

For vehicles having anti-slip regulation, under certain conditions the drive power of the engine is temporarily reduced. In order to eliminate the associated engine drag moment while making comfortable starting possible, for example on an upward incline, an electrically controlled intervention in the clutch operation is expedient.

As with all interventions in the driving and braking of a vehicle, for example anti-slip regulation and an anti-blocking system, a high degree of safety is necessary. Consequently, it is desirable that the electronic control not clutch further than is specified by the driver via the clutch pedal. If the control is used to declutch, it is advantageous if the counter pressure at the clutch pedal does not change. It is desirable for partial operation of the clutch performed by the control (half-declutched) to be overridden at any time by the driver, in other words, the driver is able to fully declutch by pedal operation.

It is an object of the invention to provide a pressure-medium operated clutch in which a controlled clutch operation is superimposed on the pedal-operated clutch, while the above-mentioned safety conditions are met.

This and other objects are achieved by providing a clutch operating cylinder with a release piston which is axially displaceable in a cylindrical housing and which acts via a pushrod on a clutch release fork imposed upon by a restoring spring. The cylinder includes a partition which divides the housing into first and second chambers, the release piston having a rest position in an axially middle region of the first chamber. A second coaxial piston in the first chamber has a rest position substantially adjacent the partition. The cylinder includes a third coaxial piston in the second chamber and spring means between the partition and the third coaxial piston for holding the third coaxial piston in a rest position at a first end wall of the housing. First and second piston rods on either side of the second coaxial piston are provided, with the first piston rod supporting the release piston when the release piston is in the rest position, while the second piston rod extends through the partition and contacts the third piston in the rest positions of the second and third coaxial pistons. The cylinder also includes a pressure medium line connectable to an input cylinder of the clutch and opening both through the first end wall into the second chamber and into the first chamber close to the rest position of the release piston between the release piston and the second coaxial piston. A further pressure medium line is connectable to a pressure accumulator and can be shut off, this further pressure medium line opening into the first chamber between the partition and the second coaxial piston.

As shown below, all safety requirements demanded are met by this apparatus. The special advantages are the simple design and, consequently, the inexpensive production, long service life and reliable functioning of the clutch operating cylinder.

Further details of the invention are to be taken from the subsequent description of an exemplary embodiment. It relates to a clutch operating cylinder since this is the easiest way of superimposing the desired function on the pedal-operated function. However, it is also contemplated to provide a correspondingly designed clutch input cylinder, or for it to act in parallel with the clutch operating cylinder on the release fork.

Other objects, advantages and novel features of the present invention will become apparent from the following detailed description of the invention when considered in conjunction with the accompanying drawings.

BRIEF DESCRIPTION OF THE DRAWING

The single drawing is a sectional view of a clutch operating cylinder constructed in accordance with a preferred embodiment of the present invention.

DETAILED DESCRIPTION OF THE DRAWING

The drawing shows a clutch operating cylinder, the cylindrical housing 1 of which is separated by a partition 2 into two unequally sized chambers. In its position of rest, the release piston 3, known per se, is arranged approximately in the middle of the first, larger chamber. Connected to this piston 3 is the push rod 3a, which extends through the end wall 1b of the housing 1 and acts in a known manner on a release fork 10 of the clutch, which is mounted at point 11 and is imposed upon by a restoring spring 9.

Likewise provided in the larger chamber is second coaxial piston 4 which, in its position of rest, is arranged close to the partition 2.

A third coaxial piston 5 is provided in the second, smaller chamber and arranged between this piston and the partition 2 is a helical spring 6, which holds the piston in its position of rest, at the end wall 1a of the housing.

The second piston 4 has on either side piston rods 4a and 4b, one of which 4a, in the rest position of the pistons, supports the release piston 3, and the other of which 4b, extends through a bore hole of the partition 2 and, in the position of rest of the pistons, contacts the third piston 5.

A pressure medium line 7 coming from the clutch input cylinder (schematically shown as 16) passes through the end wall 1a of the housing 1 into the smaller chamber via line 7a. The pressure medium line 7 also opens into the larger chamber close to the rest position of the release piston 3 between the piston 3 and the second piston 4.

A further pressure medium line 8, which is connected to a pressure accumulator (schematically shown as 17) and which can be shut off, passes between partition 2 and second piston 4 into the larger chamber.

The spaces which exist between end wall 1b and the release piston 3 on the one hand and between partition 2 and the third piston 5 on the other hand are connected with the outside atmosphere by openings 15 in the end wall 1b and in the housing wall close to the partition 2. The space 12 between the release piston 3 and the second piston 4, the space 13, between the second piston 4 and the partition 2, and the space 14 between the third piston 5 and the end wall 1b are filled with pressure medium. In a preferred embodiment, the pressure medium is hydraulic or brake oil. These spaces 12, 13, 14 are sealed off from one another and from the atmosphere, which is not included in the drawing on account of the diagrammatic representation. Similarly, the shut-off of the pressure medium line 8 and the control electronics are also not shown, but these are designed in a known manner for anti-slip regulation, in other words, with inlet and outlet valves, reservoir and a charging facility for the pressure accumulator 17. However, these do not constitute part of the invention and are known to those of ordinary skill in the art.

The functioning of this clutch operating cylinder is described below.

If the clutch pedal is operated, the pressure built up by the cylinder 16 is transferred via the pressure medium line 7 to the spaces 12 and 14. The pressure reaching the space 12 via the pressure medium line 7b bears against the piston 4 and displaces the release piston 3. There is the same pressure in the space 14, for which reason the piston 5 is not displaced since it is in contact with the piston 4 via the piston rod 4b. In this manner, declutching and reclutching via the clutch pedal is possible.

If declutching is performed via the electronic control, pressure reaches the space 13 via the pressure medium line 8 and displaces piston 4, and thus also the release piston 3, in the direction of the end wall 1b. At the same time, space 12 keeps its volume constant. Piston 5 then only remains in contact at the helical spring 6, which has a clutch characteristic in its design so that the spring 6 holds the piston 5 in a rest position at the end wall 1a of the housing 1. Due to the operation of the release fork 10, declutching is performed although the clutch pedal stays in its position of rest.

In the event that a stronger declutching is necessary than is being performed via the clutch pedal, pressure passes from the pressure accumulator 17 into the space 13 via the pressure medium line 8. The piston 4 is thereby displaced in the direction of the release piston 3, which is not in its position of rest owing to the pedal operation. As a result, the volume of the space 12 is reduced until the piston rod 4a reaches the release piston 3. The volume displaced from the space 12 is taken up in the increasing space 14 via the line 7b, 7a, this volume displacing the piston 5 in the direction of the partition 2. The input cylinder 16, and thus the clutch pedal, remains in its position.

If partial declutching first takes place by the electronic control, as already described above, the increasing pressure in space 13 causes the piston 4, and thus the release piston 3, to be displaced, without the volume in space 12 changing. The piston 5 only remains in contact at the helical spring 6. If declutching is then performed via the clutch pedal, pressure passes into the space 14 via the pressure medium line 7, 7a, the piston 5 is displaced against the force of the helical spring 6 until it is in contact with the piston rod 4b.

The two pistons 4 and 5 then remain in this position as long as the electronically controlled pressure in the pressure medium line 8 remains constant, while the release piston 3 can be displaced via the pressure supplied by the clutch pedal, the input cylinder 16 and the pressure medium line 7, 7b, until it is in its end position, in which there is full declutching. Once all the pressures have been relieved, the pistons 3, 4 and 5 return to their positions of rest under the action of the forces of the restoring spring 9 and the helical spring 6.

It is apparent from the description of the function of the clutch operating cylinder that the requirements made are fully met. The clutch pedal engages when it is operated by the driver after prior declutching by the electronic control; it is never possible to clutch further by the electronic control than specified by the clutch pedal; and either the clutch pedal or the electronic control can be used for fully declutching when the clutch is only partially declutched.

From the preceding description of the preferred embodiments, it is evident that the objects of the invention are attained, and although the invention has been described and illustrated in detail, it is to be clearly understood that the same is by way of illustration and example only and is not to be taken by way of limitation. The spirit and scope of the invention are to be limited only by the terms of the appended claims.

What is claimed is:

1. A clutch operating cylinder for a pressure-medium operated clutch which is arranged in a power train of a motor vehicle equipped with a control of the drive power, with release piston means which is axially displaceable in a cylindrical housing and which acts via a push rod on a clutch release fork imposed upon by restoring spring means, comprising:
    partition means for dividing said housing into first and second chambers, said release piston means having a rest position in an axially middle region of said first chamber;
    second coaxial piston means in said first chamber having a rest position substantially adjacent said partition means;
    third coaxial piston means in said second chamber;
    spring means between said partition means and said third coaxial piston means for holding said third coaxial piston means in a rest position at a first end wall of said housing;
    first and second piston rods on either side of said second coaxial piston means, said first piston rod supporting said release piston means when said release piston means is in said rest position, and said second piston rod extending through said partition means and contacting said third piston means in said rest positions of said second and third coaxial piston means;
    a pressure medium line connectable to an input cylinder of the clutch and opening both through said first end wall into said second chamber and also into said first chamber closest to said rest position of said release piston means between said release piston means and said second coaxial piston means; and
    a further pressure medium line connectable to a pressure accumulator and which can be shut off, said further pressure medium line opening into said first chamber between said partition means and said second coaxial piston means.

2. A clutch operating cylinder for a pressure-medium operated clutch which is arranged in a power train of a motor vehicle equipped with the control of the drive power, which acts via a pushrod on a clutch release fork imposed upon by restoring spring means, comprising:
    a housing having at least first and second chambers separated by partition means;
    means for fluidly connecting said first and second chambers to an input cylinder of said clutch;
    means for fluidly connecting said first chamber to a pressure accumulator;

first piston means connected to said pushrod in said first chamber; and second piston means in said second chamber;

wherein said first and second piston means are interconnected and controlled by pressures in said first and second chambers so as to control said pushrod.

3. A clutch operating cylinder according to claim 2, further including third piston means in said first chamber between said pushrod and said first piston means.

4. A clutch operating cylinder according to claim 3, wherein said first piston means has a rest position substantially adjacent said partition means;

said second piston means has a rest position substantially adjacent an end wall of said housing; and said third piston means has a rest position in an axially middle region of said first chamber.

5. A clutch operating cylinder according to claim 4, further comprising first and second piston rods on either side of said first piston means, said first piston rod supporting said third piston means when said third piston means is in said rest position, and said second piston rod extending through said partition means and contacting said second piston means in said rest positions of said first and second piston means.

6. A clutch operating cylinder according to claim 5, further comprising spring means between said partition means and said second piston means for holding said second piston means in said rest position.

7. A clutch operating cylinder according to claim 6, wherein said means for fluidly connecting said first and second chambers to said input cylinder opens through said end wall of said second chamber and into said first chamber closest to said rest position of said third piston means between said third piston means and said first piston means; and said means for fluidly connecting said first chamber to said pressure accumulator opens into said first chamber between said partition means and said first piston means.

* * * * *